United States Patent Office 3,253,014
Patented May 24, 1966

3,253,014
PROCESS FOR PREPARING ACRYLONITRILE BY CATALYTIC SYNTHESIS FROM OLEFINS, AMMONIA AND OXYGEN
Edgar Lamar McDaniel and Howard Seth Young, Kingsport, Tenn., assignors to Eastman Kodak Company, Rochester, N.Y., a corporation of New York
No Drawing. Filed July 31, 1961, Ser. No. 127,824
5 Claims. (Cl. 260—465.3)

This application is a continuation-in-part of our copending application Serial No. 83,916, filed January 23, 1961.

This invention relates to the preparation of aliphatic unsaturated nitriles, and more particularly acrylonitrile, by a novel and improved method wherein an olefin, ammonia and oxygen are reacted together in the vapor phase, in the presence of a particular catalyst comprising bismuth and certain inorganic heteropoly acids.

It is known that unsaturated nitriles can be prepared by reacting olefins with ammonia under oxidizing conditions at elevated temperatures. For example, J. N. Cosby in U.S. Patent No. 2,481,826, issued September 13, 1949, describes the preparation of lower aliphatic nitriles such as acrylonitrile, methacrylonitrile and acetonitrile by reacting an olefin such as propene, butene-1, etc. with ammonia and oxygen, at 400–600° C., in the presence of various oxidation catalysts and especially vanadium oxides containing molybdenum oxide. Where propene was used as the starting olefin, yields not exceeding about 6 mole percent (Example 6) of acrylonitrile and a substantial amount (10 mole percent) of hydrogen cyanide were obtained. In J. D. Idol, Jr., U.S. Patent No. 2,904,580, issued September 15, 1959, a vapor phase method is also described for preparing acrylonitrile, wherein a mixture of propylene, ammonia and oxygen is passed over a catalyst comprising the bismuth, tin, and antimony salts of phosphomolybdic and molybdic acids and bismuth phosphotungstate. This process is stated to require not only careful control of the surface area of the catalyst and pressure conditions, but the amount of water employed is a critical factor.

We have now found that by reacting propylene, ammonia and oxygen at elevated temperatures, in the presence of a catalyst comprising bismuth and an inorganic heteropoly acid or salts thereof, and more especially a catalyst comprising in effect a mixture of essentially of bismuth oxide and hexamolybdochromic acid, that the reaction goes smoothly to a relatively higher conversion to the principal product acrylonitrile, and to a considerably lesser amount of acetonitrile, with a minimum of by-products as compared with prior art processes such as mentioned above, and that water is not critical to operability of the process of this invention, since excellent activity and selectivity can be obtained without water diluent.

It is, accordingly, an object of the invention to provide a novel and improved method for the synthesis of aliphatic unsaturated nitriles wherein a carbon-to-carbon double bond is conjugated with the carbon-to-nitrogen triple bond and in particular acrylonitrile.

Another object is to provide a novel process for converting propylene to acrylonitrile in high conversion and high yield in a continuous process. Yet another object is to convert olefins to nitriles while maintaining the olefinic bond in the alkyl moiety of the nitrile.

An object of the invention is to provide a means of converting propylene to acrylonitrile by use of a bismuth and hexamolybdochromic acid catalyst. A further object of the invention is to provide a means of converting olefins to α,β-unsaturated nitriles by used of a bismuth and hexamolybdochromic acid catalyst. Another object is to introduce nitrogen from ammonia into organic compounds by use of a bismuth and hexamolybdochromic acid catalyst.

It is also an object of the invention to provide a method for synthesizing acrylonitrile without the use of such hazardous and toxic chemicals as hydrogen cyanide, acetylene, and ethylene oxide.

Another object of the invention is to provide a process of converting propylene, ammonia and oxygen into acrylonitrile over a bismuth and hexamolybdochromic acid catalyst wherein the conditions of the process may be varied over wide ranges. It is a further object of the invention to provide a means of producing acrylonitrile with the simultaneous production of large quantities of heat which may be recovered and utilized.

A further object of the invention is to provide a novel catalyst comprising bismuth and hexamolybdochromic acid for the conversion of propylene, ammonia and oxygen to acrylonitrile. Another object of the invention is to provide a bismuth and hexamolybdochromic acid catalyst for the conversion of methyl groups attached to olefinic carbon atoms into nitrile groups.

Other objects will become apparent from the description and examples hereinafter.

In accordance with the invention, we prepare unsaturated aliphatic nitriles, and more especially acrylonitrile, by passing a feed mixture comprising a short-chain olefin containing from 3–5 carbon atoms such as propylene, butylene, 2-methylbutene-1, etc., ammonia and oxygen, in vapor phase at elevated temperatures, over a catalyst comprising bismuth and an inorganic heteropoly acid. The preferred process is the conversion of propylene to acrylonitrile employing bismuth oxide or a bismuth compound convertible with heat to the oxide with hexamolybdochromic acid. The reaction is illustrated below with propylene.

$$CH_2=CH-CH_3 + NH_3 + \tfrac{3}{2}O_2 \rightarrow CH_2=CH-CN + 3H_2O$$

A minor proportion of acetonitrile is also formed. The ratios of reactants may be widely varied from the theoretical mole ratios of propylene:oxygen:ammonia of 1:1½:1. We prefer ratios near these values; however, the process is operable at propylene:oxygen ratios from as low as 1:0.05 to those as high as 1:10 and propylene:ammonia ratios as low as 1:0.05 to those as high as 1:10, i.e. from 0.05–10.0 moles of ammonia and from 0.05–10.0 moles of oxygen per mole of the olefin. Both propylene:oxygen and propylene:ammonia ratios may be varied from the theoretical ratios. Water may be fed to the reactor, or it may be omitted. Water acts as a diluent and, when used, the preferred amounts range from 0.05–2.0 moles per mole of the propylene in the feed. Nitrogen may be fed to the reactor. This has no particular effect upon the chemistry involved, but has the practical advantage that since nitrogen is not detrimental, air may be used as the source of oxygen. If air is used, the ratio of oxygen to nitrogen will be approximately 1:4. The temperature of the reaction can also be varied within the limits of about 300–600° C., but preferably in the range of about 400–550° C. The reaction is also not significantly pressure dependent. For example, it may be operated satisfactorily at atmospheric pressures, which condition is preferred, but lower or sub-atmospheric pressures and higher or super-atmospheric pressures may also be used to give generally similarly good results. The choice of operating pressures may be governed by economic considerations. The gaseous hourly space velocity (GHSV) may also be varied over a wide range, for example, values (S.T.P.) as low as 100 may be used, and values as high as 6000 may be used. The preferred space velocity is in the range of about 150–1000. The catalyst may be used either in a fixed bed or in fluidized state. In the latter case, the catalyst exists as small particles which are suspended in an upflowing stream of reactant gases. The latter method of carrying out the invention offers advantages such as, for example, superior temperature control, and less explosive hazard. Water may be included, if desired, although this is not critical for the reaction goes well without such addition. Oxygen may be fed in elemental form or as air. Also, inert gases such as nitrogen, argon, etc. can be admixed with the oxygen.

In general, any type of apparatus that is suitable for carrying out the process of the invention in the vapor phase may be employed, e.g., a tubular type of reactor or furnace which can be operated in continuous or intermittent manner and is equipped to contain the catalyst in intimate contact with the entering gases. The reacted gases are then conducted to suitable cooling and separatory equipment and the products further separated and recovered by any of the methods known to those skilled in the art. For example, one such method involves scrubbing the effluent gases from the reactor with cooled water or an appropriate solvent to remove the products of the reaction. In such case, the ultimate nitrile products may be separated by conventional means such as distillation of the resulting liquid mixtures. Unreacted ammonia and olefin may be recovered and recirculated through the system. Spent catalyst may also be reactivated by heating in contact with air.

The composition of the catalyst is all-important. Bismuth salts such as bismuth nitrate which decompose under the conditions of the catalyst preparation presumably to bismuth oxide ($Bi_2O_3$) are used as a promoter. With this is mixed a heteropoly acid, e.g., the preferred hexamolybdochromic acid of the empirical formula $H_3CrMo_6O_{21}$ as described by L. C. W. Baker et al., J. Am. Chem. Soc., 77, 2136–42 (1955), and the mixture then calcined at 450–600° C. for several or more hours. Actually, the ammonium salt of this acid is used because it is more easily prepared than the free acid and is believed to decompose to the free acid under the high temperatures employed in the calcination step. A key portion of the invention resides in the incorporation of the heteropoly acid anion into the catalyst composition. The concentration of the bismuth component and the heteropoly acid component may each vary from about 3 percent to 75 percent by weight of the catalyst. While molybdenum is shown as the coordinating element, it will be understood that other elements including the vanadium and chromium families of elements can be substituted for the molybdenum to form generally similar heteropoly acids, for example, vanadium, niobium, tantalum, tungsten and uranium. In addition, more than one of these elements may serve as coordinating elements in the heteropoly acid, and when more than one element serves as coordinating atoms, molybdenum may be included. The above acids may likewise be mixed with bismuth salts or oxide in the mentioned proportions, calcined as indicated and reduced to operable granules or particles. The catalyst may contain a support such as silica, alumina, silica-alumina, kieselguhr, pumice, titania, magnesia, alundum, clay, etc.

In all of the following examples, exactly the same conventional equipment was employed for carrying out the reaction of the invention, as well as other reactions for comparative purposes, including the separation of the products from the effluent gases by scrubbing with water and their ultimate separation by distillation. The products were analyzed by conventional analytical procedures. The definitions as used in the examples and Table I are defined as follows:

The percent conversion to acrylonitrile may be based on propylene or on ammonia.

Based on propylene, percent conversion =

$$\frac{\text{moles acrylonitrile formed}}{\text{moles propylene fed}} \times 100$$

Based on ammonia, percent conversion =

$$\frac{\text{moles acrylonitrile formed}}{\text{moles ammonia fed}} \times 100$$

The yield may be calculated based on propylene or on ammonia.

Based on propylene, percent yield =

$$\frac{\text{moles acrylonitrile formed}}{\text{total moles propylene consumed}} \times 100$$

Based on ammonia, percent yield =

$$\frac{\text{moles acrylonitrile formed}}{\text{total moles ammonia consumed}} \times 100$$

Conversions and yields to acetonitrile are similarly defined with the moles of acetonitrile formed replacing moles of acrylonitrile in the appropriate expression.

Gaseous hourly space velocity (GHSV) is defined as the number of volumes of feed gases S.T.P.) which pass through one volume of catalyst bed in one hour.

*Example 1*

A catalyst comprising 37 percent bismuth oxide and 33 percent hexamolybdochromic acid on silica was prepared thusly: 400 g. of an aqueous silica sol which was 30 percent $SiO_2$ was placed in a beaker equipped with a power stirrer and situated on an electric hot plate. Then 163.5 g. of ammonium hexamolybdochromiate crystals, represented by the formula $(NH_4)_3CrMo_6O_{21} \cdot 10H_2O$ as described by L. C. W. Baker et al., ibid., was pulverized with a porcelain mortar and pestle. The powdered ammonium hexamolybdochromiate was slowly added to the vigorously stirred silica sol, which resulted in a gel. To the vigorously stirred gel was added a solution of 308 g. of bismuth nitrate $[Bi(No_3)_3 \cdot 5H_2O]$ in 21 ml. of concentrated nitric acid and 210 ml. of water. The gel broke to a thin slurry which was heated with continued stirring. When hot, the slurry set to a thick gel. It was transferred to an evaporating dish and dried on a steam bath overnight. The preparation was calcined for four hours at 500° C. in a muffle furnace. The resulting catalyst was crushed, and 200 ml. of 40 x 120 mesh material was charged to a fluidized-solids reactor. The data shown in Table I were then taken for a series of runs. The catalyst was quite active and selective for the synthesis. Minor concentrations of acetonitrile and hydrogen cyanide were also formed.

Referring to the table, Example 1, it will be noted that a yield as high as 82.6 mole percent of acrylonitrile, based on the propylene consumed, was obtained at a temperature of 495° C., and a space velocity of 450, employing a feed mixture in the mole ratios of 1 mole of propylene to each 1.5 moles of oxygen, each mole of ammonia, each mole of water and each 6 moles of nitrogen. The conversion to acrylonitrile was 68.0 mole percent, while the conversion to acetonitrile was only 7.1 mole percent. Lower reaction temperatures resulted in lower conversions, for example, only 47.8 mole percent of acrylonitrile at 465° C., while the conversion to acetonitrile increased to 9.5 mole percent. However, all of the runs represent satisfactory operating conditions. As indicated previously, the water can be dispensed with entirely, if desired, without materially affecting the conversion and yield values for acrylonitrile.

Example 2

This example illustrates the relatively poor conversions to acrylonitrile and higher conversions to acetonitrile when only hexamolybdochromic acid (without bismuth) is used on a silica in the vapor phase reaction of propylene, ammonia and oxygen.

in an air muffle furnace at 500° C. to decompose the nitrate. Two hundred grams of 40 x 100 mesh of this catalyst was tested in a laboratory fluidized-solids reactor.

The data are shown in Table 1. Some nitrile was produced, but conversion and yields were low and more acetonitrile than acrylonitrile was produced.

TABLE 1

| | | | | Mole Percent | | | | | |
|---|---|---|---|---|---|---|---|---|---|
| Example | Catalyst Temp., ° C. | Mole Ratios, $C_3H_6:O_2:NH_3:H_2O:N_2$ | GHSV, S.T.P. | Convn. to ACN, on $C_3H_6$ or $NH_3$ | Yield of ACN, on $C_3H_6$ | Yield of ACN, on $NH_3$ | Convnt. MeCN, on $C_3H_6$ or $NH_3$ | Yield of MeCN, on $C_3H_6$ | Yield of MeCN, on $NH_3$ |
| 1 | 490 | 1:1½:1:1:6 | 630 | 44.5 | 54.1 | 44.5 | 7.5 | 9.1 | 7.5 |
| | 490 | 1:1½:1:1:6 | 630 | 45.4 | 54.7 | 45.4 | 7.3 | 8.8 | 7.3 |
| | a 480 | 1:2:1.3:1:8 | 630 | a 44.6 | 55.0 | 34.4 | a 5.3 | 6.5 | 4.1 |
| | 485 | 1:1½:1:1:6 | 840 | 35.8 | 50.0 | 35.8 | 6.2 | 8.6 | 6.2 |
| | 495 | 1:1½:1:1:6 | 450 | 68.0 | 82.6 | 68.0 | 7.1 | 8.7 | 7.1 |
| | 465 | 1:1½:1:1:6 | 540 | 47.8 | 61.8 | 47.8 | 9.5 | 12.3 | 9.5 |
| | 520 | 1:1½:1:1:6 | 720 | 46.8 | 64.4 | 46.8 | 8.7 | 11.8 | 8.7 |
| | 490 | b 1:1½:1:0:7 | 630 | 45.0 | 60.0 | 45.0 | 7.8 | 10.4 | 7.8 |
| 2 | 475 | 1:1½:1:1:6 | 630 | 7.4 | 18.5 | 7.4 | 19.1 | 47.9 | 19.1 |
| | 475 | 1:1½:1:1:6 | 630 | 3.5 | 9.5 | 3.5 | 13.5 | 36.8 | 13.5 |
| | 495 | 1:1½:1:1:6 | 630 | 5.3 | 12.0 | 5.3 | 13.6 | 31.0 | 13.6 |
| 3 | 450 | 1:1½:1:1:6 | 630 | 0 | 0 | 0 | Small | Small | Small |
| 4 | 470 | 1:1½:1:1:6 | 630 | 1.8 | 4.1 | 1.8 | 7.1 | 16.0 | 7.1 | a For this one cut, the conversion shown is that based on propylene. The conversion based on ammonia is equal to the yield based on ammonia, and is not equal to the conversion based on propylene.
b For this one cut, water was not fed.
NOTE.—ACN stands for acrylonitrile and MeCN for acetonitrile.

A catalyst was prepared which was approximately 30 percent hexamolybdochromic acid on silica. Ammonium hexamolybdochromiate crystals were dissolved in 1200 ml. of boiling water. Then 600 g. of 30 percent silica sol was added to this solution. The resultant slurry was boiled with stirring until it set to a gel. It was dried on a steam bath overnight and then calcined two hours at 540° C.

The catalyst was crushed and sieved, and 200 ml. of 40 x 100 mesh material was charged to a fluidized-solids reactor. The test data are shown in Table 1. This catalyst had low activity for nitrile formation, and more acetonitrile than acrylonitrile was produced.

Example 3

This example illustrates the adverse results obtained when only silica is used as the catalyst in the vapor phase reaction of propylene, ammonia and oxygen.

A sample of silica sol (30 percent $SiO_2$ in $H_2O$) was evaporated in an evaporating dish on a steam bath and then was dried in an oven at 130° C. After calcination at 500° C. for four hours, 200 ml. of 40 x 100 mesh silica was charged to a laboratory fluidized-solids reactor. This material was tested at 450° C., with a propylene: oxygen: ammonia: water: nitrogen mole ratio of

1:1½:1:1:6 and a GHSV of 630. This material was almost inert, producing no nitrile and allowing only a small amount of propylene to be burned to $CO_2$ and $H_2O$.

When the reaction temperature was increased to 470° C. at the same GHSV and ratios of reactants as before, no nitriles were produced. Changing the propylene:oxygen:ammonia:water:nitrogen ratios to 1:2:1½:1:8 at 470° C. did not produce nitrile.

Example 4

This example illustrates the very poor results obtained when just a bismuth oxide on silica catalyst is employed in the vapor phase reaction of propylene, ammonia and oxygen.

A catalyst comprising 30 percent $Bi_2O_3$ on silica was prepared by adding bismuth nitrate in dilute nitric acid solution to silica sol. The white slurry was heated with stirring on a steam bath until it thickened. It was then dried in an oven at 130° C., and calcined for six hours The results as tabulated in above Table 1 illustrate the unusual and synergistic effects of bismuth oxide and hexamolybdochromic acid when combined in the catalyst. No satisfactory explanation can be given. Either component is quite inactive in the absence of the other. Undoubtedly part of the explanation lies in the porous and skeletal-like structure of the hexamolybdochromic acid. However, even when this structure is present, an activator, i.e., bismuth, is necessary for activity to produce acrylonitrile.

While the process of the invention has been shown in the examples with specific proportions of bismuth oxide and hexamolybdochromic acid, it will be understood that any proportions coming within the mentioned operable range will given generally similar good conversions and yields of acrylonitrile under the prescribed conditions. Also, as previously set forth the other mentioned heteropoly acids can be substituted in the process of the invention for the hexamolybdochromic acid. However, the latter heteropoly acid is preferred. Acrylonitrile is of course known to be useful as an intermediate in organic synthesis of pharmaceuticals, dyes, etc., as well as being the basic component in many synthetic polymers that are useful for preparing fibers, sheets, molded objects, and the like.

The invention has been described in detail with particular reference to preferred embodiments thereof, but it will be understood that variations and modifications can be effected within the spirit and scope of the invention as described hereinabove and as defined in the appended claims.

What we claim is:

1. A process for preparing acrylonitrile which comprises reacting a mixture comprising propylene, ammonia and oxygen in the proportions of from 0.05–10.0 moles of the ammonia and 0.05–10.0 moles of the oxygen to each mole of the propylene, in the vapor phase at a temperature of from 300–600° C., in the presence of a catalyst consisting essentially of bismuth oxide and hexamolybdochromic acid on a carrier.

2. The process according to claim 1 wherein the said mixture also contains from 0.05–2.0 moles of water.

3. The process according to claim 1 wherein the said oxygen is contained in the said mixture in the form of atmospheric air.

4. The process according to claim 1 wherin the said mixture is in the proportions of 1 mole of the ammonia and 1.5 moles of the oxygen to each mole of propylene, and wherein the said temperature is from 400–550° C.

5. The process according to claim 4 wherein the said mixture also contains from 0.05–2.0 moles of water and wherein the said oxygen is contained in the said mixture in the form of atmospheric air.

References Cited by the Examiner

UNITED STATES PATENTS

| | | | |
|---|---|---|---|
| 2,481,826 | 9/1949 | Cosby | 260—465.3 |
| 2,898,305 | 8/1959 | Teter et al. | 252—455 |
| 2,904,580 | 9/1959 | Idol | 260—465.3 |
| 2,983,691 | 5/1961 | Richardson | 252—453 |
| 3,009,943 | 11/1961 | Hadley et al. | 260—465.3 |
| 3,050,546 | 8/1962 | Milberger | 260—465.3 |
| 3,053,881 | 9/1962 | Kremer et al. | 260—465.3 |

FOREIGN PATENTS 1,255,121  1/1961  France.

CHARLES B. PARKER, *Primary Examiner.*

JOSEPH R. LIBERMAN, *Examiner.*